United States Patent [19]
Burrell et al.

[11] Patent Number: 5,680,192
[45] Date of Patent: Oct. 21, 1997

[54] ELECTRO-OPTICAL DISPLAY DEVICE WITH ENLARGED VIEWING AREA AND SINGLE-SIDED DRIVER CONNECTION

[75] Inventors: Gary L. Burrell, Lenexa; Jonathan C. Burrell, Olathe, both of Kans.

[73] Assignee: Garmin Corporation, Olathe, Kans.

[21] Appl. No.: 493,907

[22] Filed: Jun. 23, 1995

[51] Int. Cl.⁶ .................................................. G02F 1/1345
[52] U.S. Cl. ............................................ 349/152; 349/149
[58] Field of Search .................................. 349/149, 150, 349/152; 359/271

[56] References Cited

U.S. PATENT DOCUMENTS

| | | | |
|---|---|---|---|
| 4,297,004 | 10/1981 | Nishimura et al. | 349/138 |
| 4,466,701 | 8/1984 | Ogata et al. | |
| 5,058,996 | 10/1991 | Washizuka et al. | 349/142 |
| 5,189,539 | 2/1993 | Suzuki | 349/150 |
| 5,311,339 | 5/1994 | Fertig et al. | |
| 5,612,804 | 3/1997 | Hara | 349/152 |

FOREIGN PATENT DOCUMENTS

| | | | |
|---|---|---|---|
| 5-100240 | 4/1993 | Japan | 349/150 |

Primary Examiner—William L. Sikes
Assistant Examiner—Charles Miller
Attorney, Agent, or Firm—Kokjer, Kircher, Bowman & Johnson

[57] ABSTRACT

An electro-optical display device having an improved connector arrangement. The display device includes a plurality of pixels arranged in commons and segments, with a lead trace associated with each commons and with each segment. These lead traces extend outward from an endmost commons to an edge of the device for subsequent connection to driving apparatus. The set of leads associated with the set of commons extends normally from such set of commons to the proximate edge of the device. The remaining set of leads, associated with the segments, is provided with lead traces which are redirected to also extend towards this same side of the device. As such, all leads for the device are accessible on a single side of the device. This may be accomplished by dividing the remaining set of commons in half, with each of these half-sets of leads being directed to a location on an associated side of the initial leads for the first set of commons. In this manner, a single connection is required between the device and the driving equipment, with such a connection typically being capable of formation by a low cost heat seal.

21 Claims, 2 Drawing Sheets

1

ELECTRO-OPTICAL DISPLAY DEVICE WITH ENLARGED VIEWING AREA AND SINGLE-SIDED DRIVER CONNECTION

BACKGROUND OF THE INVENTION

1. Field of the Invention

The present invention relates in general to electro-optical devices. In particular, the present invention relates to an improved display design which utilizes transverse conductive seal technology to allow a single sided connection between a display and a display driver, with a unique interconnect and driver configuration that maximizes display viewing area relative to the overall LCD width.

2. Description of the Related Art

The use of electro-optical display devices has become extremely prevalent in electronic equipment. Electro-optical display devices typically include planar configurations such as Liquid Crystal Displays (LCDs), Plasma Gas Discharge Displays (PGDDs), Field Effect Displays (FEDs) and others. Nonplanar configurations include Cathode Ray Tubes (CRTs) among others. LCDs, PGDDs and other planar displays commonly are comprised of two or more parallel glass plates uniformly spaced from one another via thousands of insulative spacer balls suspended in a bead of sealant material that is distributed uniformly around the perimeter of the viewable area. The cavity formed by the parallel glass plates and sealant is filled with a medium such as liquid crystal polarizer material to form the LCD or Plasma gas to form the PGDD. Each of the parallel glass plates contains multiple finely etched lines or elements of transparent conductive material on one surface thereof which are used to form the characters or patterns on the display. In LCDs and PGDDs having capability to display graphic images, the transparent etched lines are commonly arranged to form rows and columns upon the LCD, hereafter generically referred to as segments and commons. The glass plates are arranged with the transparent conductive lines located upon opposite glass surfaces aligned at a perpendicular angle to one another. Hence, lines on the back side of the front glass plate overlap lines on the front side of the back glass plate at a 90 degree angle relative to one another. One end of each transparent conductive line is attached, via an etched lead trace to a corresponding contact pad designated as a terminal mounted upon the periphery of the glass plates. The pads are connected to electronic circuits termed drivers through which electrical signals are applied to the LCD. When equal and opposite polarity voltages are applied through the conductive pads to overlapping conductive lines, a black or opaque region (referred to as a pixel) appears upon the display screen proximate the intersection between the segment and common intersecting conductive lines.

In the past, the driver integrated circuits were connected to the contact pads by attaching at least one driver to a group of contact pads mounted on the back side of the front glass and by attaching at least one driver to a group of contact pads mounted on the front side of the back glass. These drivers selectively apply equal and opposite alternate polarity voltages to desired commons and segments to cause selected intersections therebetween to turn black, thereby conveying alpha numeric messages and graphic images to the user.

Heretofore, within the LCD manufacturing industry, a new form of technology has been utilized, generally referred to as "transverse seal technology". Transverse seal technology involves the construction of the LCD with parallel glass plates separated from one another with conductive spacer balls replacing the nonconductive spacer balls in the sealant material at selected locations such as to allow connections from the back surface of the front glass to the front surface of the back glass. Utilizing conductive spacer balls about the glass plates affords the ability to render low resistance electrical connections between aligned conductive lines upon the adjoining faces of the front and back glass plates. Hence, by positioning conductive spacer balls between the front and back glass plates between corresponding adjacent conductive lines, transverse seal technology provides the ability to electrically interconnect a conductive common or segment upon the back glass plate with a conductive lead and terminal contact pad upon the front glass plate. Such an electrical interconnection allows the contact pads and driver connections for all commons and segments to be located upon one glass plate. For example, if the drivers are attached to contact pads upon the front surface of the back glass plate, conductive spacer balls are appropriately positioned to electrically interconnect desired contact pads with corresponding commons or segments upon the opposed front glass plate.

Transverse seal technology requires low resistance connections, through the conductive spacer balls, between the front and back glass plates. To achieve such low resistance connections, it is necessary to maintain a specified minimum area for each transverse seal interconnection. Further, it is necessary to maintain a minimum spacing or gap between adjacent seal transfer connections to avoid low resistance shorting between adjacent conductive contact pads, lead traces, commons, and segments.

The primary benefits of transverse seal technology are to allow unusual patterns on displays by accommodating complex interconnections and/or simplifications of the LCD module assembly by providing electrical connections between the front glass and back glass thereby accommodating single sided connections of drivers to the LCD terminal area. However, while the transverse seal technology has been utilized to attach the drivers to a single glass plate, heretofore, an LCD arrangement has not been proposed which optimally utilizes the transverse seal technology to achieve maximum viewing area relative to the overall glass size in a configuration which allows single sided attachment of the driver to the LCD terminals.

Specifically, as noted above, the commons and segments intersect to form the active viewing area. About the periphery of this viewing area, lead traces electrically connect each common and each segment with a unique corresponding contact pad. Heretofore, the lead trace configurations have required large inactive transition areas between the active viewing area and the contact pads. Accordingly, LCDs using these lead trace configurations exhibit active viewing areas substantially smaller than the overall size of the glass plates.

Moreover, some existing lead trace configurations provide overlap or crossover points between lead traces upon opposite glass plates. The lead traces create black dots at the crossover points when the crossing lead traces are driven with opposed polarity voltages (just as commons and segments create black dots at crossovers in the viewing area). Accordingly, the conventional lead trace configurations have rendered the active viewing area unduly small and have resulted in undesirable black dots appearing about the periphery of the viewing area.

Further, such designs have not provided an efficient single sided connection between the LCD and the driver. Specifically, past connection configurations have failed to align and orient the connectors along a single side of a single glass plate in a manner which maximizes the viewing area upon the LCD and avoids crossover black dots.

A need remains within the LCD industry for an improved configuration which maximizes an active viewing area while providing all driver connections along a single side thereof. It is an object of the present invention to meet this need.

SUMMARY OF THE INVENTION

It is an object of the present invention to use transverse seal technology with a desired driver configuration to provide a larger viewing area relative to an overall LCD, PGDD, FED or other planar display glass size with a single sided driver connection.

It is a corollary object of the present invention to provide a configuration which introduces a transverse seal into the normal seal area adjacent to the terminal area while meeting design requirements of the transverse seal technology.

It is a corollary object of the present invention to provide a unique configuration which identifies and uses a unique driver configuration which allows approximately half of the common lines to be derived from the top of the driver and half of the common lines to be derived from the bottom of the driver, while all of the segment lines are derived from the middle of the driver.

It is a further object of the present invention to provide a unique configuration which maintains minimum specification requirements for the conductive line widths and spacings therebetween, within the transverse seal, while maximizing the viewing area.

Another object of the present invention is to provide a glass configuration for planar electro-optical display devices which avoids crossovers of conductive paths upon adjacent faces of the glass plate thereby preventing undesirable active dots or pixels scattered about the periphery of the active viewing area.

A further object of the present invention is to provide for an electro-optical display device which is easily and reliability manufactured.

Yet another object of the present invention is to provide connection of the device to the printed circuit board by use of relatively inexpensive processes and equipment.

A further object of the present invention is to provide a method of electrically connecting an electro-optical display device in which all connections directly to the device are made with a single bonding operation.

These and other objects are achieved by an electro-optical display device having an improved arrangement. The display device includes an active viewing area containing a plurality of pixels which are defined by commons and segments with a lead trace associated with each common and with each segment. Each lead trace extends outward from each segment and common and is directed to the transverse seal area along one side of the LCD without crossing any other lead. The lead traces associated with the conductive segments extend from one side of the viewing area to the adjacent contact area of the LCD. These lead traces connect with contact pads located at an intermediate section of the contact area. The lead traces, associated with the commons are separated into two halves, which extend from opposed ends of the viewing area to contact pads within upper and lower sections of the contact area. As such, all lead traces for the device are accessible along a single contact area upon one side of the device. In this manner, a single contact area is required between the LCD and the driver, with such a connection typically being capable of formation by a low cost single step heat seal operation.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
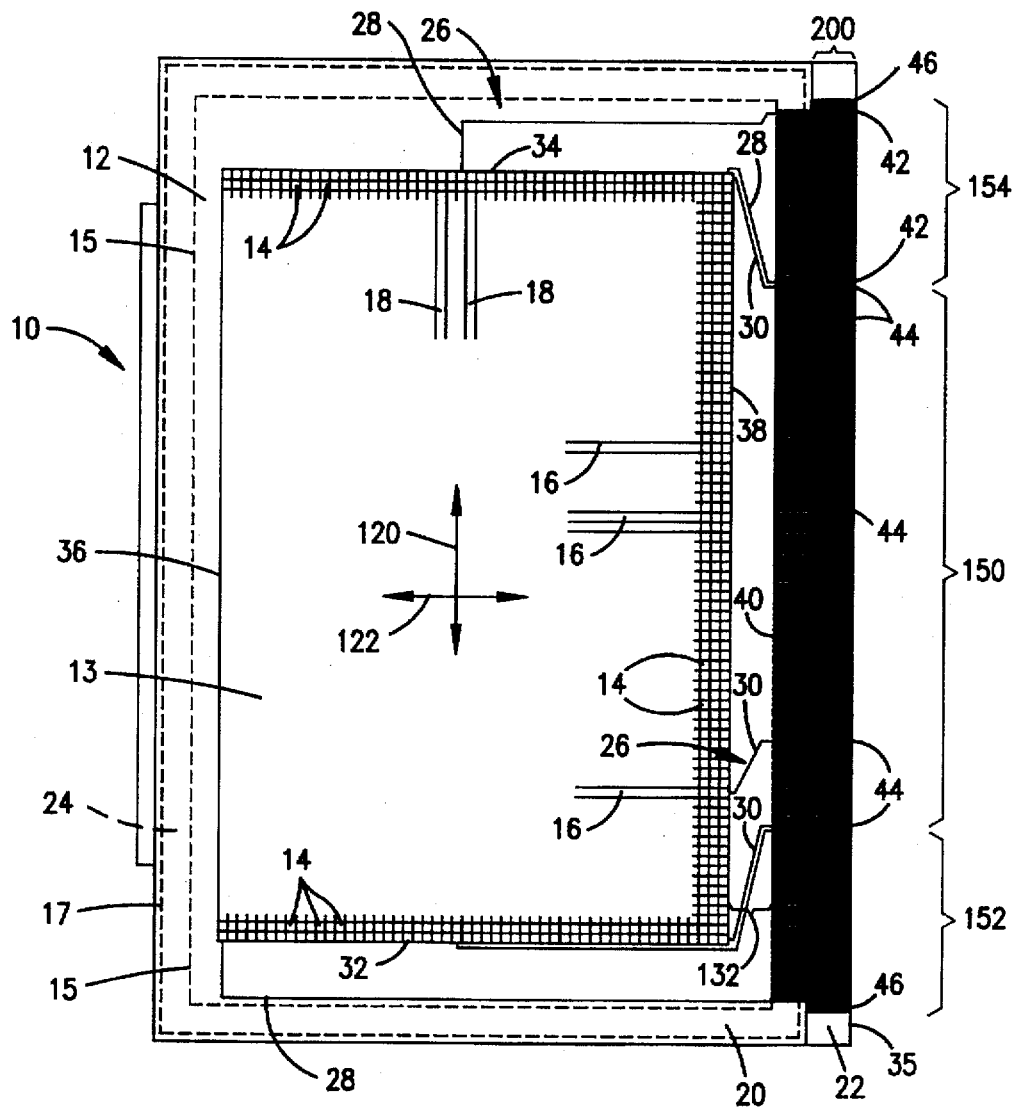
FIG. 1 is a plan view of an electro-optical device according to the present invention.

With reference to FIG. 1, an electro-optical display device according to the present invention is generally designated by reference numeral 10. The device 10 includes a display area 12 (bordered by the dashed line 15) which is visible to the user. The display area 12 includes an active area 13 containing a plurality of selectively activated pixels 14. The active area 13 is used to display alpha numeric messages and graphic images to the user. The pixels 14 are arranged in an array, which in the preferred embodiment is a Cartesian array, such that the pixels are aligned upon x and y axes. As viewed in FIG. 1, the pixels are formed from horizontally extending segments 16 and vertically extending commons 18.

By way of example, the commons 18 and segments 16 extend generally perpendicular to each other and will typically form a generally rectangular shape with square overlapping regions called pixels which are the smallest viewable elements of the display.

Figure 2:
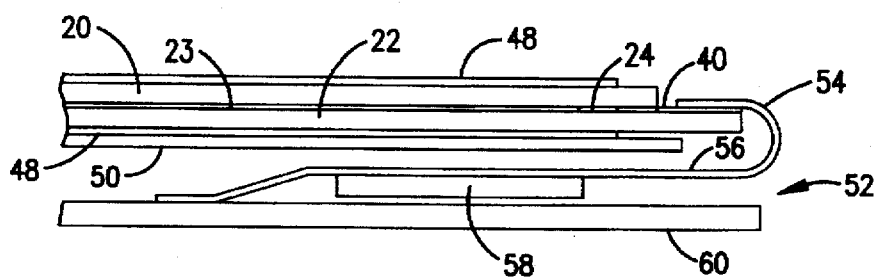
FIG. 2 is a side view of the device in FIG. 1 connected to a driver and a printed circuit board.

The electro-optical display device illustrates an LCD which includes a pair of glass plates 20 and 22 (FIG. 2), held in spaced opposed relation by a plurality of spacer balls surrounded by a peripheral bead of seal termed the seal area (FIG. 2). The balls and seal bead extend about the plates 20 and 22 within the seal area 24 located between dashed border lines 15 and 17 (FIG. 1). A cavity 23 located between the plates 20 and 22, within the display area 12 bounded by the sealing area 24, is filled with a liquid crystal polarizer material (not shown) to form the LCD. The active viewing area 13 includes first and second common ends 32 and 34 between which the commons 18 extend, and first and second segment ends 36 and 38, between which the segments 16 extend. Each common 18 represents a conductive line of material finely etched into a back side of the front glass plate 20. Each segment 16 represents a conductive line of material finely etched into a front side of the back glass plate 22. Optionally, the commons 18 and segments 16 may be reversed upon the plates 22 and 24. When intersecting lines are driven with opposite polarity voltages, the intersecting pixel region 14 therebetween turns black or opaque to the viewer.

A unique electrically conductive lead trace 26 is connected to, and extends outward from, each common 18 and each segment 16. As may be seen, one lead trace 26 is associated with each of the commons 18, and one lead trace 26 is associated with each of the segments 16. For clarity, the various lead traces 26 are referenced as common traces 28 and segment traces 30. Each common and segment trace 28 and 30 is attached to the corresponding common or segment contact pads 42 and 44, respectively, within the contact area 40. The common and segment contact pads 42 and 44 are etched in one of the glass plates 20 and 22 and along one side thereof. By way of example, the common pads 42 and segment pads 44 may be etched on the front side of the back glass plate 22, along with the segments 16 and segment traces 30, while the commons 18 and commons traces 28 may be etched in the back side of the front glass plate 20. Also, by way of example, the segments pads 44 may be grouped in an intermediate section 150 in the contact area 40, while the common contact pads 42 may be split approximately equally between first and second sections 152 and 154 located upon opposite sides of the intermediate section 150.

Transverse seal connectors 134 are provided in the first and second outer sections 152 and 154 and are located opposite to the commons contact pads 42. If the commons pads 42 are provided upon the back glass 22, then the connectors 134 are provided on the front glass plate 20 immediately opposite corresponding commons contact pads 42. The seal connectors 134 on the front glass electrically connect with the commons contact pads 42 on the back glass via conductive spacer balls therebetween.

Figure 3:
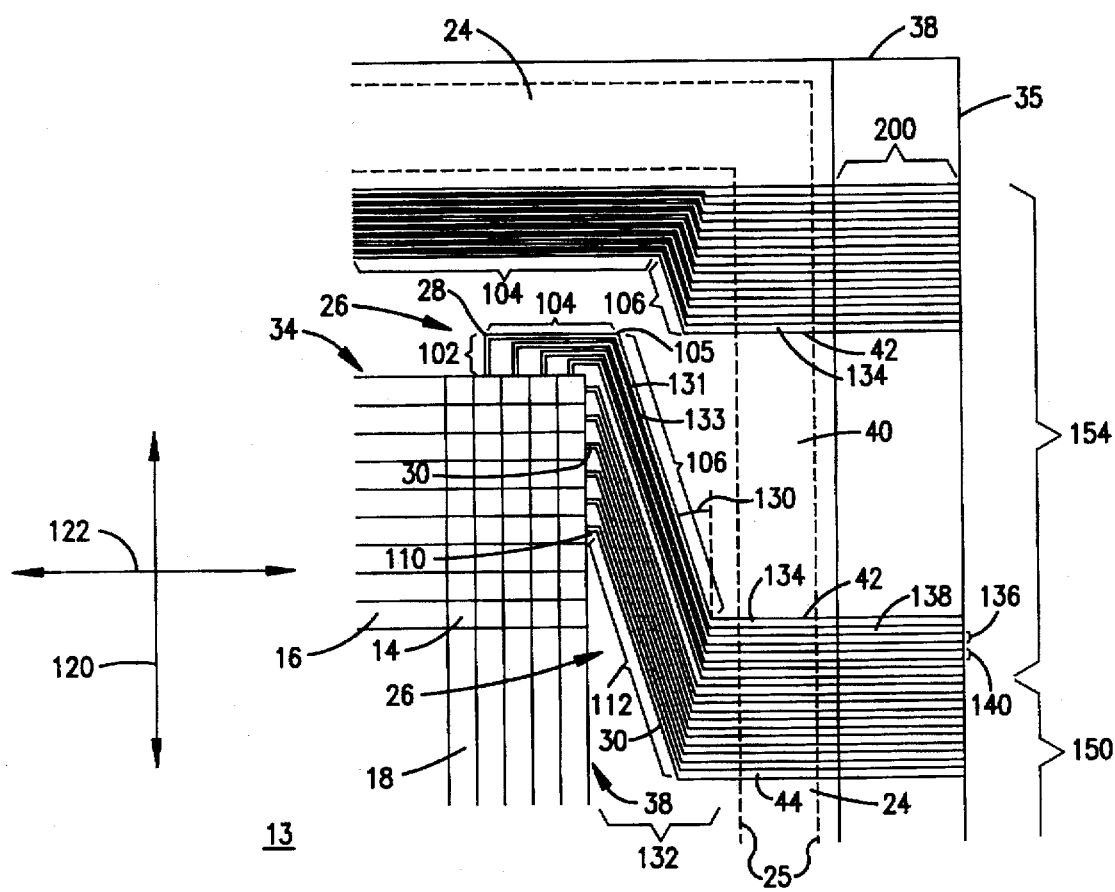
FIG. 3 illustrates a more detailed view of a portion of the transverse seal area and a portion of the viewing area of FIG. 1.

Hereafter, the configuration of the lead traces is explained in detail in connection with FIG. 3. For purposes of this explanation, it is assumed that the commons 18 are aligned parallel to a longitudinal axis 120 and the segments 16 are aligned parallel to a lateral axis 122. Each commons trace 28 may include a lead section 102, a middle section 104, and a transition section 106, each of which are electrically connected with one another. Each segment trace 30 may include a lead section 110 and a transition section 112 electrically connected with one another. As explained below in more detail, the orientation of the sections 102–112 provide a compact lead trace arrangement with a maximum viewing area 13 which avoids crossovers between traces.

Beginning with the commons traces 28, each lead section 102 projects laterally outward from a corresponding common 18 along a path substantially parallel to the longitudinal axis 120 of the commons 18. The length of the section 102 is dependent upon the position of the common 18 along the viewing area 13. As illustrated in FIG. 3, the lead sections 102 become progressively longer as they are spaced further from the edge 38 of the viewing area 13 proximate the contact area 40. This progression in length is necessary to enable each lead section 102 to join a corresponding middle section 104. The middle sections 104 are aligned to extend along one of the edges 34 of the active area 13 and align substantially parallel to the lateral axis 122. The middle sections 104 join, at a 90 angle, with corresponding lead sections 102. The middle sections 104 extend along a side of the viewing area 13 to an intersecting point 105 proximate an inactive, transition area 132 between the active viewing area 13 and the contact area 40. The middle section 104 intersects a corresponding transition section 106. The transition sections 106 extend from the intersecting point 105 and traverse the transition area 132 at an acute angle 130 with respect to the longitudinal axis 120.

An object of this invention is to minimize the angle 130 in order to minimize the width of the transition area 132 between the active viewing area 13 and the contact area 40. The right edge of each transition section 106 is electrically connected to a corresponding transverse seal connector 134. The seal connector 134 is formed with a substantially rectangular cross-section as shown in FIG. 3. Each transverse seal connector 134 includes a width 136 equal to that of a common contact pad 42. Adjacent seal connectors are separated via a gap 138. Adjacent seal connectors 134 are configured such that a distance between corresponding leading edges (generally referred to as the pitch 140) is not less than the minimum allowable distance in the LCD technology. The size parameters of the seal connectors 134 are dictated by the minimum area, line width, and required separation of the current system limitations used to form the seals. As such equipment is improved in accuracy, the dimensions of the seal connectors 134 may be reduced. The dimensions of the seal connectors 134 are further dependent upon the maximum acceptable resistance within the transverse seal connection. As the maximum acceptable resistance increases, similarly, the area of the transverse seal 134 may be reduced.

Turning to the segment traces 30, each trace includes a lead section 110 and a middle section 112. The lead sections 110 extend in a direction parallel to the lengths of the lateral axis 122 of the segments 16. The lead sections 110 are staggered in length to avoid interference between the middle sections 112 of adjacent segment traces 30. The lead sections 110 are arranged in an inverted pyramid shape with the longest sections 110 located proximate the center of the transition area 132 and the shortest sections 110 located proximate opposite ends of the transition area 132. It should be understood that the pyramid arrangement is used to locate the transition sections 112 substantially parallel to one another. Alternatively, the lead sections 110 may have equal lengths (or be removed) while the transition sections 112 may be aligned at a small acute angle with respect to adjacent transition sections 112. In this alternative arrangement, the transition sections 112 would include a somewhat flared configuration with the ends proximate the contact area 40 spaced relatively close to one another and the ends proximate the viewing area 13 spaced laterally further apart from one another.

The lead traces 26 are formed with a width 131 and spaced apart from one another by a gap 133. The middle sections 112 of the segment traces 30 project from the lead sections 110 at an angle, in the preferred embodiment corresponding to the angle 130, between the transition section 106 and longitudinal axis 120. Hence, the transition sections 112 extend substantially parallel to the transition sections 106. The transition sections 112 of the segment traces 30 include an outer end which is electrically connected to a corresponding segment contact pad 44.

As noted above, the contact area 40 includes an intermediate section 150 and first and second outer sections 152 and 154. Separating the transverse seal connectors 134 and corresponding common pads 42 between opposite ends of the contact area 40 minimizes the number of lead traces 26 which must pass around one end of the viewing area 13 which in turn enables the active area 13 to be located in close proximity to the contact area 40. The width of the transition area 132 is further minimized by forming the smallest acceptable angle 130 between the transition sections 106 and the longitudinal axis 120. The angle 130 is limited by the width 131 and gap 133 requirements mandated for the transition section 106. Each common and segment trace 28 and 30 should maintain a minimum width and should be spaced from an adjacent trace by a minimum gap. These defining parameters set the minimum angle 130, which similarly sets the minimum distance 132 between the active area 13 and the contact area 40.

An equation that defines the shortest separation distance (D) between the active area and the transfer seal area pads is as follows:

$$D = N \times (Ps-Pm) \times \text{Cotangent}(\text{Cosine}^{-1}(Pm/Ps));$$

wherein

D is the distance 132 from active area to transfer seal pads,

N is the maximum number of Commons on either side of the Segments;

Ps is the minimum pitch within the seal area 24 (i.e., the minimum distance 140 between corresponding edges of adjacent seal connectors 134);

Pm is the minimum pitch within the transition area 132 (i.e., the minimum distance 131 and 133 between corresponding edges of adjacent transition sections 106 of adjacent segment traces 30).

As an example if a display has Ps (minimum transverse seal pitch) of 0.36 mm and Pm (minimum pitch on interior the active viewing area) is 0.105 mm and 65 commons; and is designed according to this invention with commons split approximately equally top and bottom with 33 at one end and 32 at the other end then N is 33 segments and $$D = 33 \times (0.36-0.105) \times \text{Cot}(\text{Cos}^{-2}(0.36/0.105)) = 2.56 \text{ mm}.$$

Present LCD design rules require 2 mm between seal areas and active area, so in the above example only 2.56−2.00=0.56 mm extra width is required to accommodate single sided driver connections.

Conversely, if the same display is designed with all of the common connections at the same end of the terminals as in prior the art then- $$D = 65 \times (0.36-0.105) \times \text{Cot}(\text{Cos}^{-1}(0.36/0.105)) = 5.05 \text{ mm}$$

The latter design would add approximately 2.5 mm to the overall width of the LCD for the same active area as in the first example.

With improving processes, the minimum line width and spacing dimensions will become smaller allowing smaller angles.

For ease of connection, in the preferred embodiment each contact pad 42 and 44 has an enlarged width in comparison to the lead traces 28 and 30, and it is this contact pad which extends beyond the seal area 24 (defined by lines 25) through the region generally designated by the reference numeral 200. Additionally for ease of connection, and as is known in the prior art, it is preferred that the contact pads 42 and 44 extend to the peripheral edge(s) of the device.

In the present invention, each of the common and segment traces 28 and 30 are directed to extend to a single edge and single surface of the device proximate one of the edges 32 through 38. Each of the traces terminates in a contact pad extending substantially perpendicular to the edge. The traces 30 and associated contact pads 44 are arranged in a serial fashion corresponding to the serial arrangement of the segments 16 within the viewing area 13, and the pads 44 are formed as a continuous set on the edge 34.

As shown in FIG. 1, it is preferred that the common contact pads 42 be located with a minimum of space therebetween, such that the outer section 152 and 154 have the smallest practicable length along the edge 35. It is preferable to minimize the length of each section 152 and 154 in order to locate the innermost commons contact pad 42 of each section 152 and 154 as close as possible to the edges 32 and 34 (FIG. 1) of the viewing area, thereby minimizing the number of commons traces 28 angled inward in the transition area 132.

Various arrangements for the traces 28 and pads 42 are possible. For example, all of the commons traces may be grouped together such that all of the commons pads 42 are located in a single portion of the contact area 40. Further, the intermediate section 150 of segments contact pads 44 may be spread out along the contact area 40 with spacing therebetween greater than the minimum gap in order to evenly fill the region between the outer sections 152 and 154 and to align more evenly with a corresponding segment 16.

The particular division of the commons into the two sets may of course take forms other than a division into two sets of serial, contiguous commons as shown. For example, the division may be made between the even numbered commons and the odd numbered commons. Other, more complicated divisions are also possible. Additionally, the number of commons in each of the two sets need not be generally equal, although this is preferred for centering purposes.

The above-described arrangement is the basic form of the inventive device. Other details may of course be added. For example, it may be desired to add one or more dummy pads 46 at each end of the series of pads 40 to serve as fiducial alignment marks.

The connection of the device 10 to other components will now be described with reference to FIGS. 2 and 4. As is shown, the contact pads 42 and 44 are present on an accessible face of one of the plates 20 or 22 (separated by a gap and sealant 24). The plates may have various polarizers 48, back-lights 50, etc. associated therewith, although they form no part of the present invention. The device 10 will be connected to a driving means 52 which provides electrical signals to the pads 40 for activation of the device 10.

In the preferred embodiment shown, the driving means includes Driver Integrated Circuit mounted on a flex tape connector 56 (FIG. 2) having multiple lead traces (not shown) thereon. The connector 56 has a first end which forms the connector 54, and thus includes traces and pads suitable for individual connection with the pads 40 on the device 10.

Spaced from this first end, the connector 56 mounts one or more driver chips 58 in operative connection to the lead traces. The driver chip preferable takes the form of a programmable driver, such as those commercially available from Epson Corporation under model No. SED1560TOB. Other exemplary drivers may include the Toshiba model No. TGA04 or Hitachi HD 66108. Such driver chips may be programmed to provide the proper signals to the pads 40, which consist of the two spaced sets of commons pads 42 and the interposed segment pads 44. Alternatively, multiple chips may be mounted upon the connector, with each chip being connected to lead traces associated with the pads 44 or pads 42 (or one of the set of pads 42).

The second end of the connector 56 is connected to driver printed circuit board (PCB) 60. The second end of the connector also includes lead traces which are operatively connected to circuits on the PCB and to the chip(s) 58 on the connector. In this manner, the PCB will provide initial signals to the driver IC 58, which will in turn provide final signals to the pads 40 on the device 10, thus causing the desired operation of the pixels.

Figure 4:
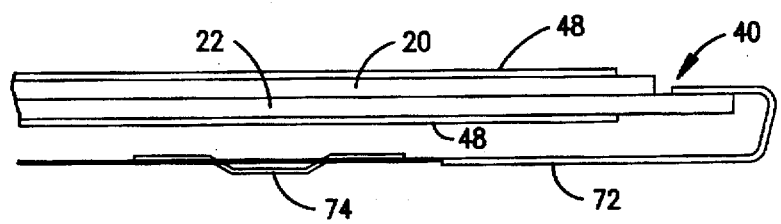
FIG. 4 illustrates a side view of the device connected in an alternative embodiment to a driver via a flex circuit or heat seal connector.

FIG. 4 illustrates an alternative embodiment in which the contact pads 42 and 44 are connected to one end of a flex circuit 72 through a heat seal. The opposite end of the flex circuit 72 is attached to a driver 74 also through a heat seal.

From the above it may be seen that the method of connecting the device 10 to the driver means consists of providing the device 10 with the described lead trace and contact pad arrangement, and thereafter performing a single connecting operation such as heat seal or Anisotropic Film (ACF) between the device 10 and the driver means. As described above, previous or subsequent steps to complete the driver means are typically also necessary.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In an electro-optical display device comprised of an active viewing area, a contact area, and a transition area therebetween, said viewing area being surrounded by first and second opposed segment edges and first and second opposed common edges, said active viewing area containing a plurality of conductive segments extending between said opposed segment edges and containing a plurality of conductive commons extending between said opposed commons edges, said transition area containing a plurality of lead traces, each having a first end connected to an associated one of said commons and segments and a second end connected to an associated contact pad within the contact area, the improvement comprising:

said contact pads and contact area being located along one side edge of said display device proximate said first segment edge of the viewing area, said lead traces being separated into at least two groups, a first group of lead traces extending laterally outward at an acute angle from the contact area in a first direction toward said first commons edge, a second group of lead traces extending laterally outward at an acute angle from the contact area in a second direction, toward said second commons edge, wherein none of said lead traces within said transition area crossover one another.

2. The improvement of claim 1, wherein said contact pads are separated into first and second groups located within opposite halves of the contact area, each of said first and second groups being divided into first and second subgroups, wherein said first subgroups are located proximate one another near a center of the contact area and wherein said second subgroups are located remote from one another and proximate opposite ends of the contact area, said first and second subgroups being electrically connected to segments and commons, respectively.

3. The improvement of claim 1, wherein said lead traces within said first and second groups extend laterally outward from one another to form a nested V-shape arrangement of lead traces.

4. The improvement of claim 1, wherein contact pads connected to said commons are separated into two sections located at opposite ends of the contact area.

5. The improvement of claim 1, wherein said device includes first and second glass plates joined in a spaced relation to form the active viewing area thereupon, said first glass plate containing all of said contact pads along one edge thereof, said second glass plate containing all of the lead traces corresponding to said commons, thereon, wherein contact pads and lead traces corresponding to said commons are connected to transverse seal connectors extending between said first and second glass plates to electrically connect commons contact pads on said first glass plate with commons lead traces on said second glass plate.

6. The improvement of claim 1, wherein said device includes first and second glass plates joined in a spaced relation to form the active viewing area therebetween, said first glass plate containing all of the contact pads along one edge thereof and containing all of the lead traces corresponding to said segments, said second glass plate containing all of said lead traces corresponding to said commons, wherein none of the commons lead traces and segment lead traces overlap one another.

7. The improvement of claim 1, wherein said device further includes first and second glass plates joined in a spaced relation to form the active viewing area thereupon and having the contact area along one edge thereof, said device including transverse seal connectors extending between said first and second plates within the contact area, each of said transverse seal connectors being aligned with a corresponding contact pad to electrically connect a contact pad and lead trace upon opposite glass plates.

8. The improvement of claim 1, wherein each lead trace is constructed with a minimum width and is spaced from an adjacent trace with a minimum gap distance, said lead traces extending laterally outward from corresponding contact pads at a minimum acute angle with respect to a longitudinal axis of the viewing area, said minimum acute angle being based upon said minimum lead trace width and said minimum gap distance between adjacent lead traces.

9. The improvement of claim 1, wherein each contact pad is aligned at substantially a perpendicular angle to a corresponding edge of the device, and wherein each lead trace includes a transition section attached to a corresponding contact pad, said transition section extending laterally outward from said contact pad at an acute angle with respect to said edge of the device, said transition section being attached to a corresponding end of a corresponding one of said commons and segments.

10. The improvement of claim 1, wherein said electro-optical device utilizes transverse seal connectors within the contact area.

11. In an electro-optical display device of the type having an active viewing area surrounded by a peripheral sealing area spaced outward from the viewing area by a transition area, said active viewing area containing a plurality of conductive segments forming commons and segments, with each common and each segment having one end connected with a first end of an associated lead trace extending therefrom, each lead trace having a second end connecting with an associated contact pad, all of which are mounted along one peripheral edge and upon one side of the device, the improvement comprising:

said contact pads being separated into an intermediate and first and second outer sections, with the intermediate section containing contact pads corresponding to the segments and with the first and second sections containing contact pads corresponding to the commons, said lead traces for the commons extending along opposite sides of the viewing area, said lead traces for the segments extending peripherally outward toward said peripheral edge and being operatively connected to a first set of said contact pads corresponding to said one of said commons or said segments; and said lead traces from the other of said commons or said segments being directed towards said set of said contact pads, and being operatively connected to at least a second set of said contact pads corresponding to said other of said commons or said segments, said at least second set of contact pads being arranged in proximity to, and as a continuation of, said first set of contact pads.

12. The improvement of claim 11, wherein said at least one peripheral edge comprises four peripheral edges, and wherein said sets of pads are arranged along a common one of said four edges.

13. The improvement of claim 12, wherein said one of said commons or said segments consists of a greater number of said commons or said segments than does said other of said commons or said segments.

14. The improvement of claim 12, wherein said common one of said edges extends substantially perpendicular to said one of said commons or said segments.

15. The improvement of claim 14, wherein said one of said commons or said segments consists of a greater number of said commons or said segments than does said other of said commons or said segments.

16. The improvement of claim 11, wherein said at least second set of contact pads comprises second and third sets of contact pads, and wherein said first set of contact pads is interposed between said second and third sets.

17. The improvement of claim 16, wherein said second and third sets of contact pads each correspond to, and are associated with, approximately half of said other of said commons or said segments.

18. An electro-optical display device comprising:

first and second viewing plates having a conductive seal sandwiched therebetween and extending about a periphery thereof, said plates containing an active viewing area surrounded by said conductive seal, said plates including a contact area along one edge thereof;

a plurality of contacts, within said contact area, all of said contacts being mounted upon said first plate;

a plurality of conductive segments etched on an inner side of said first plate and being located in said viewing area;

a plurality of segment traces etched on said inner side of said first plate, each of said segment traces extending from a corresponding segment to a corresponding segment contact, wherein all of said segment contacts are located proximate a center section of said contact area;

a plurality of conductive commons etched on an inner side of said second plate and being located within said viewing area;

a plurality of common traces etched on said inner side of said second plate, each of said common traces extending from a corresponding common to a corresponding common contact, said commons contacts being divided into first and second groups located in first and second outer sections of said contact area, said first and second outer sections being located upon either a plurality of enter section; and a plurality of seal connectors located proximate said common contacts, said seal connectors interconnecting said corresponding common contacts and common traces.

19. An electro-optical display device according to claim 18, wherein said segment and common traces are arranged upon said first and second plates in a non-overlapping arrangement.

20. An electro-optical display device according to claim 18, wherein said segment traces are divided into first and second groups which extend laterally outward toward opposite sides of the contact area in a fanned arrangement to enable the viewing area to be located a minimum distance from the contact area.

21. An electro-optical display device according to claim 18, wherein the active viewing area is spaced from the contact area by a distance based on the following equation: $D = N \times (P_s - P_m) \times COT(COS^{-1}(P_m/P_s))$, wherein $COS^{-1}(P_m/P_s)$ represents the inverse cosine of the ratio $P_m/P_s$, D represents the distance between the active viewing area and the contact area, N represents a maximum number of commons on either side of the center section, $P_s$ represents a minimum distance between corresponding edges of adjacent seal connectors, and $P_m$ represents a minimum pitch between corresponding edges of adjacent segment traces.

\* \* \* \* \*